United States Patent
Mason (10) Patent No.: US 9,674,351 B1
(45) Date of Patent: Jun. 6, 2017

(54) REMOTE VOICE RECOGNITION

(71) Applicant: Sorenson IP Holdings, LLC, Salt Lake City, UT (US)

(72) Inventor: Joseph J. Mason, West Valley City, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 15/287,370

(22) Filed: Oct. 6, 2016

(51) Int. Cl.
*H04M 3/42* (2006.01)
*G10L 15/26* (2006.01)
*G10L 15/30* (2013.01)
*H04M 3/51* (2006.01)

(52) U.S. Cl.
CPC ......... *H04M 3/42391* (2013.01); *G10L 15/26* (2013.01); *G10L 15/30* (2013.01); *H04M 3/5183* (2013.01)

(58) Field of Classification Search
CPC .................................................. H04M 3/42391
USPC ............ 348/14.08, 461, 468, 14.03; 379/52; 704/200, 235; 382/218; 455/404.1, 455/556.1; 707/731
See application file for complete search history.

(56) References Cited

U.S. PATENT DOCUMENTS

| | | |
|---|---|---|
| 4,777,469 A | 10/1988 | Engelke et al. |
| 4,959,847 A | 9/1990 | Engelke et al. |
| 5,081,673 A | 1/1992 | Engelke et al. |
| 5,325,417 A | 6/1994 | Engelke et al. |
| 5,327,479 A | 7/1994 | Engelke et al. |
| 5,351,288 A | 9/1994 | Engelke et al. |
| 5,432,837 A | 7/1995 | Engelke et al. |
| D364,865 S | 12/1995 | Engelke et al. |
| 5,581,593 A | 12/1996 | Engelke et al. |
| 5,604,786 A | 2/1997 | Engelke et al. |
| 5,687,222 A | 11/1997 | McLaughlin et al. |
| 5,724,405 A | 3/1998 | Engelke et al. |
| 5,809,425 A | 9/1998 | Colwell et al. |
| 5,909,482 A | 6/1999 | Engelke |
| 5,974,116 A | 10/1999 | Engelke et al. |
| 5,978,654 A | 11/1999 | Colwell et al. |
| 6,075,842 A | 6/2000 | Engelke et al. |
| 6,493,426 B2 | 12/2002 | Engelke et al. |

(Continued)

FOREIGN PATENT DOCUMENTS

WO   2015131028 A1   9/2015

*Primary Examiner* — Gerald Gauthier
(74) *Attorney, Agent, or Firm* — Maschoff Brennan (57) ABSTRACT

According to one or more aspects of the present disclosure operations related to performing captioning may include receiving, from a first user device, first audio data. The operations may further include directing the first audio data to a remotely located call-assistant device and receiving, from the call-assistant device, second audio data that is related to the first audio data and that is derived from speech of a call assistant. The operations may also include accessing, with a captioning software application, voice profile data of the call assistant and generating caption data that includes a transcription of the second audio data. The operations may also include generating, based on the transcription, screen data related to the captioning software application, in which the screen data includes the transcription. In addition, the operations may include directing the screen data to the call-assistant device and directing the caption data to the first user device.

23 Claims, 5 Drawing Sheets

(56) References Cited

U.S. PATENT DOCUMENTS

| | | | |
|---|---|---|---|
| 6,504,910 B1 * | 1/2003 | Engelke | H04L 12/66 340/4.13 |
| 6,510,206 B2 | 1/2003 | Engelke et al. | |
| 6,594,346 B2 | 7/2003 | Engelke | |
| 6,603,835 B2 | 8/2003 | Engelke et al. | |
| 6,882,707 B2 | 4/2005 | Engelke et al. | |
| 6,885,731 B2 | 4/2005 | Engelke et al. | |
| 7,660,398 B2 | 2/2010 | Engelke et al. | |
| 7,881,441 B2 | 2/2011 | Engelke et al. | |
| 8,416,925 B2 | 4/2013 | Engelke et al. | |
| 8,880,120 B1 * | 11/2014 | Lavian | H04M 3/493 455/556.1 |
| 8,917,822 B2 | 12/2014 | Engelke et al. | |
| 8,972,396 B1 * | 3/2015 | Zhang | G06F 17/30687 707/730 |
| 9,191,789 B2 | 11/2015 | Pan | |
| 9,197,745 B1 | 11/2015 | Chevrier et al. | |
| 9,247,052 B1 | 1/2016 | Walton | |
| 9,258,415 B1 | 2/2016 | Walton | |
| 9,336,689 B2 | 5/2016 | Romriell et al. | |
| 9,350,857 B1 | 5/2016 | Engelke et al. | |
| 9,503,568 B1 * | 11/2016 | Chevrier | H04M 1/82 |
| 2002/0161579 A1 * | 10/2002 | Saindon | G06F 17/28 704/235 |
| 2003/0169366 A1 * | 9/2003 | Lenzi | H04N 5/278 348/461 |
| 2003/0212547 A1 * | 11/2003 | Engelke | G10L 15/26 704/200 |
| 2004/0189793 A1 * | 9/2004 | Wang | H04N 5/278 348/14.08 |
| 2005/0226394 A1 * | 10/2005 | Engelke | H04M 3/42391 379/52 |
| 2006/0039542 A1 * | 2/2006 | Engelke | G10L 15/26 379/52 |
| 2006/0140354 A1 * | 6/2006 | Engelke | G10L 15/26 379/52 |
| 2007/0036282 A1 * | 2/2007 | Engelke | H04M 3/42391 379/52 |
| 2007/0142026 A1 * | 6/2007 | Kuz | B60R 25/102 455/404.1 |
| 2010/0039558 A1 * | 2/2010 | Detore | G11B 27/034 348/468 |
| 2010/0066904 A1 * | 3/2010 | Schindler | H04N 5/44513 348/468 |
| 2010/0266213 A1 * | 10/2010 | Hill | A61B 5/16 382/218 |
| 2011/0123003 A1 * | 5/2011 | Romriell | G06F 17/273 379/52 |
| 2011/0170672 A1 * | 7/2011 | Engelke | H04M 11/066 379/52 |
| 2013/0003945 A1 | 1/2013 | Caldwell et al. | |
| 2015/0098018 A1 * | 4/2015 | Starling | H04N 7/0882 348/468 |
| 2015/0130887 A1 * | 5/2015 | Thelin | H04M 3/42391 348/14.03 |
| 2015/0131786 A1 * | 5/2015 | Roach | H04M 3/42382 379/52 |
| 2016/0098995 A1 * | 4/2016 | Nelson | H04M 3/4936 704/235 |

\* cited by examiner

REMOTE VOICE RECOGNITION

FIELD

The embodiments discussed in the present disclosure are related to remote voice recognition.

BACKGROUND

The hearing impaired may have difficulty conducting communication sessions such as telephone calls, video calls, etc. with other parties due to difficulty in being able to hear the words spoken by the other parties. Captioning systems may be used to help with this problem by providing text captions to supplement a voice conversation occurring between the hearing impaired user and another participant. The text captions may be generated during the conversations but may be delayed with respect to the spoken words. Reducing the amount of delay may help improve the experience of the hearing impaired user.

The subject matter claimed in the present disclosure is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure operations related to performing captioning may include receiving, from a first user device, first audio data that is derived from a second user device that is performing a communication session with the first user device. The first user device may be configured to perform operations related to a captioning session. The operations may further include directing the first audio data to a remotely located call-assistant device and receiving, from the call-assistant device, second audio data that is related to the first audio data and that is derived from speech of the call assistant. The operations may also include accessing, with a captioning software application running in a virtual computing environment, voice profile data of the call assistant and generating, with the captioning software application, caption data that includes a transcription of the second audio data. The captioning software application may be configured to use the accessed voice profile data to generate the caption data. The operations may also include generating, based on the transcription, screen data related to the captioning software application, in which the screen data includes the transcription. In addition, the operations may include directing the screen data to the call-assistant device and directing the caption data to the first user device.

BRIEF DESCRIPTION OF THE DRAWINGS

Example embodiments will be described and explained with additional specificity and detail through the use of the accompanying drawings in which.

DESCRIPTION OF EMBODIMENTS

Captioning systems may be used to provide text captions to supplement voice conversations occurring between hearing impaired users and others during a communication session such as a telephone or video call. In some embodiments, a call assistant may listen to the audio provided by a person having a conversation with a hearing impaired user during a communication session. The call assistant may "revoice" the words of the person to a captioning software application that is tuned to the voice of the call assistant. In some embodiments, the captioning software application may be configured to generate text captions as a transcription of the words spoken by the person. In many instances, the call assistant may be remotely located from an administrative system of a captioning system that is configured to handle the routing of communication session data such as caption data and audio data.

According to one or more embodiments of the present disclosure, a captioning system may include an administrative center that includes an administrative system. The captioning system may also include a call center that includes one or more call-assistant devices of one or more call assistants. The administrative center may be remotely located from the call center and communicatively coupled to the call center.

The administrative system may be configured to direct, to a call-assistant device of a call assistant, first audio data of a communication session between a hearing impaired user and a second user. The first audio data may be derived from the second user and may include words spoken by the second user during the communication session. The call-assistant device may be configured to play the audio data to allow the call assistant to listen to the words spoken by the second user. The call assistant may "revoice" the words of the second user by repeating the words spoken by the second user. The call-assistant device may be configured to generate second audio data that is derived from the speech of the call assistant and that reflects the "revoiced" words. The call-assistant device may be configured to direct the second audio data back to the administrative system.

The administrative system may also be configured to host a virtual computing environment. The virtual computing environment may be configured to run a captioning software application that is tuned to the call assistant from whom the second audio data is derived. The administrative system may be configured to generate caption data that is a transcription of the second audio data using the captioning software application. The administrative system may also be configured to generate screen data related to the captioning software application in which the screen data includes the transcription.

The administrative system may be configured to direct the caption data to a user device of the hearing impaired user such that the transcription may be displayed at the user device as captions of the words spoken by the second user. The administrative system may also be configured to direct the screen data to the call-assistant device such that the call assistant may also view the transcription.

In some embodiments, the administrative system may be configured to host multiple virtual computing environments with each virtual computing environment running an instance of the captioning software application. Additionally, in some embodiments, each instance of the captioning software application may be tuned for a particular call assistant.

The use of virtual computing environments and associated instances of the captioning software application in the manner indicated above may reduce an amount of delay between when a word is spoken and its corresponding caption appears on the user device of the hearing impaired person. In particular, the caption data may be generated at the administrative system and directed from the administrative center to the user device instead of being generated at the call center, directed to the administrative center, and then directed from the administrative center to the user device. The communication of data between components inside the administrative system and administrative center may be faster than the communication of data between the administrative center and the call center such that the communication of the caption data to the user device may be faster with the use of the virtual computing environments.

In the present disclosure, use of the term "virtual computing environment" may include any emulation of a physical computing system that provides functionality of the physical computing system. Additionally, use of the term "virtual computing environment" may include hosting and running a software application or operating system on one computing system on behalf of another computing system that is remotely located from the computing system that is hosting and running the software application or operating system. In some embodiments, screen updates related to the software application or operating system may be directed to the other computing system as part of the virtual computing environment such that it appears that the software application or operating system are operating on the other computing system. Additionally, a computing system that is hosting a virtual computing environment that is being presented on another computing system may be referred to as hosting or running the virtual computing environment on behalf of the other computing system. Some examples of virtual computing environments may include a virtual machine, a virtual operating system operating as a virtual desktop, or a particular software application (e.g., the captioning software application). Additionally, in some embodiments, a virtual computing environment may host another virtual computing environment. For example, a virtual machine may host a virtual desktop that may host the captioning software application which may be running on behalf of a remotely located computing system.

Figure 1:
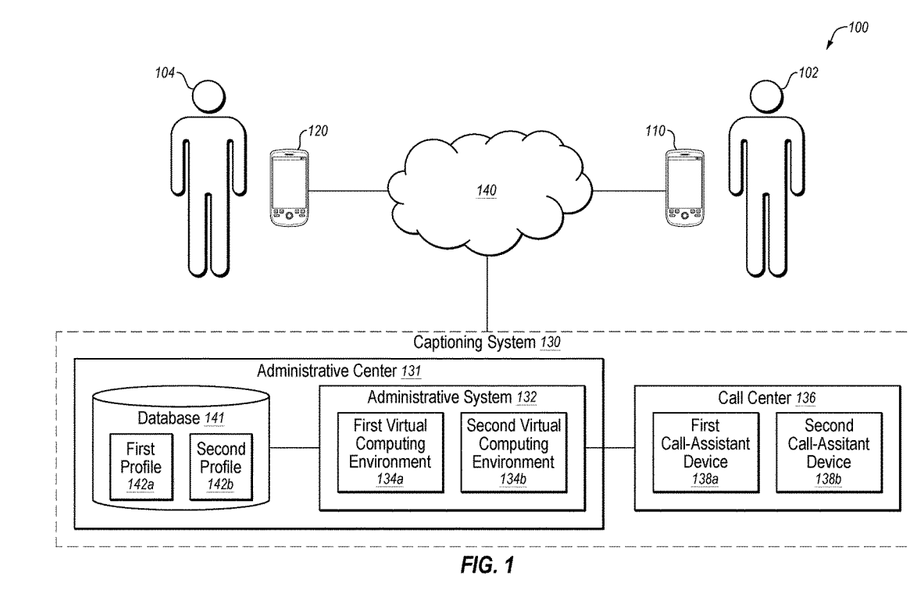
FIG. 1 illustrates an example communication system that may include a captioning system.

Turning to the figures, FIG. 1 illustrates an example communication system 100 that may include a captioning system 130. The communication system 100 may be arranged in accordance with at least one embodiment described in the present disclosure. In addition to the captioning system 130, the communication system 100 may include a first device 110 and a second device 120.

In some embodiments, the communication system 100 illustrated may be configured to facilitate an assisted call between a hearing-impaired user 102 and a second user 104. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

The captioning system 130 may be an assistive service, which is intended to permit a hearing-impaired person to utilize a communication network and assist the hearing impaired user's understanding of a conversation by providing text captions to supplement voice conversation occurring during communication sessions of the first device 110 with other devices, such as the second device 120, as described in further detail below.

The first device 110 and the captioning system 130 may be communicatively coupled by a network 140. Alternately or additionally, the first device 110 and the second device 120 may be communicatively coupled by the network 140. In these or other embodiments, the second device 120 and the captioning system 130 may be communicatively coupled by the network 140.

The first device 110 and the second device 120 may be any electronic or digital device. For example, the first device 110 and the second device 120 may include a desktop computer, a laptop computer, a smartphone, a mobile phone, a tablet computer, a phone console, or any other processing device. In some embodiments, a communication session may be established between the first device 110 and the second device 120. Alternately or additionally, the first device 110 and the second device 120 may be configured to communicate with other systems such as the captioning system 130.

The network 140 may include any network or configuration of networks configured to send and receive communications between devices. In some embodiments, the network 140 may include a conventional type network, a wired or wireless network, and may have numerous different configurations. Furthermore, the network 140 may include a local area network (LAN), a wide area network (WAN) (e.g., the Internet), or other interconnected data paths across which multiple devices and/or entities may communicate. In some embodiments, the network 140 may include a peer-to-peer network. The network 140 may also be coupled to or may include portions of a telecommunications network for sending data in a variety of different communication protocols, such as a public switch telephone network (PSTN). In some embodiments, the network 140 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 140 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 140 may include one or more IEEE 802.11 wireless networks.

In some embodiments, the captioning system 130 may include an administrative center 131. In some embodiments, the administrative center 131 may include an administrative system 132. The administrative system 132 may include any configuration of hardware, such as processors, servers, and databases that are networked together and configured to perform a task. For example, the administrative system 132 may include multiple computing systems, such as multiple servers that each include memory and at least one processor, which are networked together and configured to perform operations as described in this disclosure, among other operations. In some embodiments, the administrative system 132 may include computer-readable-instructions that are configured to be executed by the administrative system 132 to perform operations described in this disclosure.

The administrative system 132 may also include a database 141 in some embodiments. The database 141 may include any suitable computer-readable storage media configured to store data. For example, in some embodiments, the computer-readable storage media may include may include any available media that may be accessed by a general-purpose or special-purpose computer. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

In some embodiments, the database 141 may include profile data 142 associated with each call assistant of one or more call assistants. For example, in the illustrated example, the database 141 may include first profile data 142a of a first call assistant and second profile data 142b of a second call assistant.

The profile data 142 may include information or preferences specific to the corresponding call assistants. For example, the first profile data 142a may include first voice profile data of the first call assistant. The first voice profile data 142a may include speech patterns, intonations, pronunciations, etc. of the first call assistant. Additionally or alternatively, the first profile data 142a may include settings or preferences of the first call assistant with respect to a computing environment (e.g., desktop, software program, etc.) that may be used by the first call assistant. By way of example, in some embodiments, the first profile data 142a may include settings or preferences of the captioning software application. The second profile data 142b may similarly include settings or preferences of the second call assistant. Although two sets of profile data 142 are illustrated, the database 141 may store any number of profile data sets for any number of call assistants.

In some embodiments, the database 141 and the administrative system 132 may be included in a same computing system. Additionally or alternatively, the database 141 and the administrative system 132 may be communicatively coupled via any suitable localized communication protocol or network. For example, in some embodiments, the database 141 and the administrative system 132 may be communicatively coupled via a wireless and/or wired Local Area Network (LAN). Additionally or alternatively, the administrative system 132 may include multiple computing systems that may be communicatively coupled via the localized communication protocol or network.

In some embodiments, the captioning system 130 may include a call center 136. The call center 136 may be communicatively coupled to the administrative center 131 but may be remotely located from the administrative center 131 in some embodiments. In these or other embodiments, the call center 136 may be communicatively coupled to the administrative center 131 via any suitable remote-based communication protocol or network. For example, in some embodiments, the call center 136 may be communicatively coupled to the administrative center 131 via any suitable Wide Area Network (WAN). In these or other embodiments, communication over the WAN between the call center 136 and the administrative center 131 may be slower than communication over the LAN between elements included in the administrative center 131.

The call center 136 may include one or more call-assistant devices 138. In some embodiments, each of the call-assistant devices 138 may be used by a particular call assistant at one time. For instance, in the example illustrated in FIG. 1, the call center 136 may include a first call-assistant device 138a and a second call-assistant device 138b. The first call-assistant device 138a may be used by the first call assistant and the second call-assistant device 138b may be used by the second call assistant. Later, however, the first call-assistant device 138a may be used by other call assistants. In some embodiments, the call assistant devices 138 may include any suitable computing system configured to perform operations that may relate to tasks performed by the call assistants. Further explanation as to the operations performed by the call-assistant devices 138 is given below.

In some embodiments, the administrative system 132 may be configured to generate one or more virtual computing environments 134. For example, in the illustrated example, a first virtual computing environment 134a and a second virtual computing environment 134b are illustrated. Although two virtual computing environments 134 are illustrated and described, any number of virtual computing environments 134 may be generated and running at a particular time. As indicated above, the virtual computing environments 134 may include a virtual machine. Additionally or alternatively, the virtual computing environments 134 may include an instance of an operating system (sometimes referred to as a "virtual desktop"), or an instance of a software application (e.g., the captioning software application) that may be hosted by the administrative system 132 and run by the administrative system 132 on behalf of another device.

In some embodiments, the virtual computing environments 134 may be generated based on a golden image of the virtual computing environment. The golden image may be a base image of the virtual computing environment that may be used as a generic template of the virtual computing environment. In some instances, generation of a particular virtual computing environment may include spinning up a copy of the golden image to deploy the particular virtual computing environment.

Additionally or alternatively, the virtual computing environments 134 may be configured to run one or more instances of the captioning software application. In the present disclosure, reference to a virtual computing environment being configured to run the captioning software application or reference to the captioning software application "running" in a virtual computing environment may include instances in which the captioning software application is being run on behalf of a computing system that is not the computing system executing the captioning software application.

The captioning software application may include any suitable software application that may be configured to generate caption data from audio data in which the caption data includes a transcription of the audio included in the audio data. For example, in some embodiments, the captioning software application may include any suitable voice recognition computer program configured to perform speech-to-text operations.

In some embodiments, the virtual computing environments 134 may be dedicated to a particular call assistant. For example, the first virtual computing environment 134a may be dedicated to the first call assistant and the second virtual computing environment 134b may be dedicated to the second call assistant. Dedication of a particular virtual computing environment 134 to a particular call assistant may include assigning the particular virtual computing environment 134 to the particular call assistant. Additionally or alternatively, dedication of a particular virtual computing environment 134 to a particular call assistant may include configuring the particular virtual computing environment according to particular profile data 142 of the particular call assistant such that the particular virtual computing environment is customized for the particular call assistant. Additionally or alternatively, dedication of a particular virtual computing environment 134 to a particular call assistant may include directing the particular virtual computing environment to access particular profile data 142.

For example, the first virtual computing environment 134a may be dedicated to the first call assistant as indicated above such that the first virtual computing environment 134a may be configured according to the first profile data 142a. In these and other embodiments, in some embodiments, the first virtual computing environment 134a may be configured with settings or preferences of the first call assistant that may be included in the first profile data 142a such that the first virtual computing environment may be customized for the first call assistant. The second virtual computing environment 134b may be dedicated to the second call assistant in a similar manner.

Additionally or alternatively, a first instance of the captioning software application that may be running in the first virtual computing environment 134a may be "tuned" to the first call assistant based on the first profile data 142a. For example, the first instance of the captioning software application may be configured to access first voice profile data that may be included in the first profile data 142a. The first instance of the captioning software application may be configured to analyze audio data that includes words spoken by the first call assistant in view of the first voice profile data of the first call assistant in generating corresponding caption data. The analysis in view of the first profile data 142a may help increase the accuracy of the caption data. A second instance of the captioning software application that may be running in the second virtual computing environment may be similarly tuned for the second call assistant based on second voice profile data included in the second profile data 142b.

Additionally or alternatively, in some embodiments, the virtual computing environments 134 may be configured to interact with one or more of the call-assistant devices 138 such that one or more of the call-assistant devices 138 may be configured as thin-clients. The configuration of a particular call-assistant devices 138 as a thin-client device and interaction with a particular virtual computing environment 134 may allow for the particular call-assistant device 138 to have fewer components or elements due to the particular virtual computing environment 134 performing some operations on behalf of the particular call-assistant device 138.

For example, as discussed in detail below, the captioning software application that may be running in the virtual computing environments 134 may be configured to generate, on behalf of the call-assistant devices 138, caption data that relates to a communication session between the hearing-impaired user 102 and the second user 104. The generation of the caption data in the particular virtual computing environment 134 may allow for the particular call-assistant device 138 to have a sound card omitted because most of the audio processing may not be performed at the particular call-assistant device 138.

Additionally or alternatively, the particular virtual computing environment 134 may be configured to run, as a virtual desktop, an operating system on behalf of the particular call-assistant device 138. As such, in some embodiments, the particular call-assistant device 138 may have a simplified or stripped down operating system stored thereon.

The captioning system 130 may be configured to perform captioning operations with respect to a communication session between the first device 110 and the second device 120. The captioning operations performed with respect to a communication session may be referred to as "a captioning session" and may generate caption data that may include a transcription of words spoken by the second user 104 during the communication session.

During a captioning session, the captioning system 130 and the first device 110 maybe be communicatively coupled using networking protocols. In some embodiments, during the communication session between the first device 110 and the second device 120, the first device 110 may provide to the captioning system 130 first audio data that is from the second device 120 and that includes words spoken by the second user during the communication session The administrative system 132 may be configured to receive the first audio data and may direct the first audio data to a particular one of the call-assistant devices 138. In the present example, the particular call-assistant device 138 may be the first call-assistant device 138a. The first call-assistant device 138a may be configured to play the first audio data to allow the first call assistant to listen to audio that includes the words spoken by the second user 104. The first call assistant may "revoice" the words of the second user 104 by repeating the words spoken by the second user 104 as heard from the first audio data. The first call-assistant device 138a may be configured to generate second audio data that is derived from the speech of the first call assistant and that reflects the "revoiced" words. The first call-assistant device 138a may be configured to direct the second audio data back to the administrative system 132.

As indicated above, the first virtual computing environment 134a may be dedicated to the first call assistant such that the first virtual computing environment 134a may receive the second audio data. Additionally the first virtual computing environment 134a may be configured to run the first instance of the captioning software application that is tuned to the first call assistant. In some embodiments, the captioning software application may be tuned to the first call assistant based on the first audio profile data that may be included in the first profile data as described above. The administrative system 132 may be configured to generate caption data that is a transcription of the second audio data using the first instance of the captioning software application that may be running in the first virtual computing environment 134a.

The administrative system 132 may also be configured to generate screen data related to the captioning software application in which the screen data includes the transcription. In some embodiments, the first virtual computing environment 134a may be configured to generate the screen data. Additionally or alternatively, the first instance of the captioning software application may be configured to generate the screen data.

The administrative system 132 may be configured to direct the caption data to the first device 110 such that the transcription may be displayed at the first device 110 as captions of the words spoken by the second user 104. The administrative system 132 may also be configured to direct the screen data to the first call-assistant device 138a such that the first call assistant may also view the transcription. Further details related to operations that may be performed during the captioning system are given below with respect to FIGS. 4A and 4B.

Modifications, additions, or omissions may be made to the communication system 100 without departing from the scope of the present disclosure. For example, in some embodiments, the second user 104 may be hearing impaired. In these and other embodiments, the captioning system 130 may provide caption data to the second device 120 based on audio data transmitted by the first device 110 and derived from words spoken by the hearing-impaired user 102. Alternately or additionally, the captioning system 130 may include additional functionality. For example, the captioning system 130 may edit the caption data or make other alterations to the caption data after presentation of the caption data on the first device 110.

Additionally, in some embodiments, a virtual computing environment may be nested inside of another virtual computing environment and may be configured to perform captioning operations on behalf of more than one call-assistant device 138. For example, in some embodiments, a same virtual computing environment may be configured to host both the first virtual computing environment 134*a* and the second virtual computing environment 134*b*.

Moreover, the administrative center 131 and/or the administrative system 132 may include other elements not expressly illustrated or described. For example, in some embodiments, the administrative system 132 may include one or more session border controllers, one or more hold servers, and one or more Tuxedo (Transactions for Unix, Extended for Distributed Operations) servers configured to perform one or more operations described with respect to the administrative system 132. Additionally or alternatively, the hold servers and/or the tuxedo servers may also be implemented as virtual machines that may be part of one or more virtual computing environments.

Figure 2:
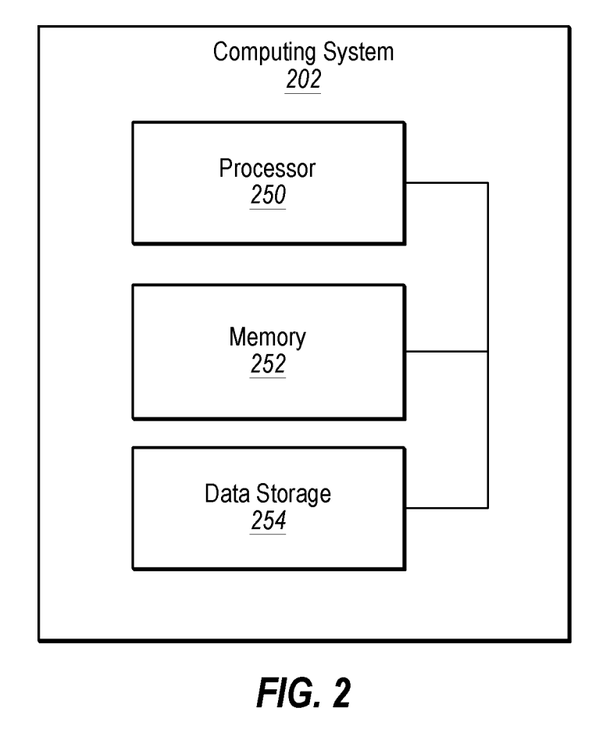
FIG. 2 illustrates an example computing system that may be configured to perform one or more operations related to a captioning session.

FIG. 2 illustrates a block diagram of an example computing system 202. The computing system 202 may be configured according to at least one embodiment of the present disclosure and may be configured to perform one or more operations related to a captioning session. One or more variations of the computing system 202 may be included in the first device 110, the second device 120, the administrative center 131, the administrative system 132, or the call-assistant devices 138 described with respect to FIG. 1. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, one or more captioning modules may be included in the data storage 254 as program instructions. The processor 250 may fetch the program instructions of the captioning modules from the data storage 254 and may load the program instructions in the memory 252. After the program instructions of the captioning modules are loaded into memory 252, the processor 250 may execute the program instructions such that the computing system 202 may implement the operations associated with the captioning modules as directed by the instructions. In some embodiments, the captioning modules may be configured to direct one or more operations associated with a captioning session.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations. In some embodiments, the database 141 of FIG. 1 may be an example of the data storage 254.

Modifications, additions, or omissions may be made to the computing system 202 without departing from the scope of the present disclosure. For example, in some embodiments, the computing system 202 may include any number of other components that may not be explicitly illustrated or described.

Figure 3:
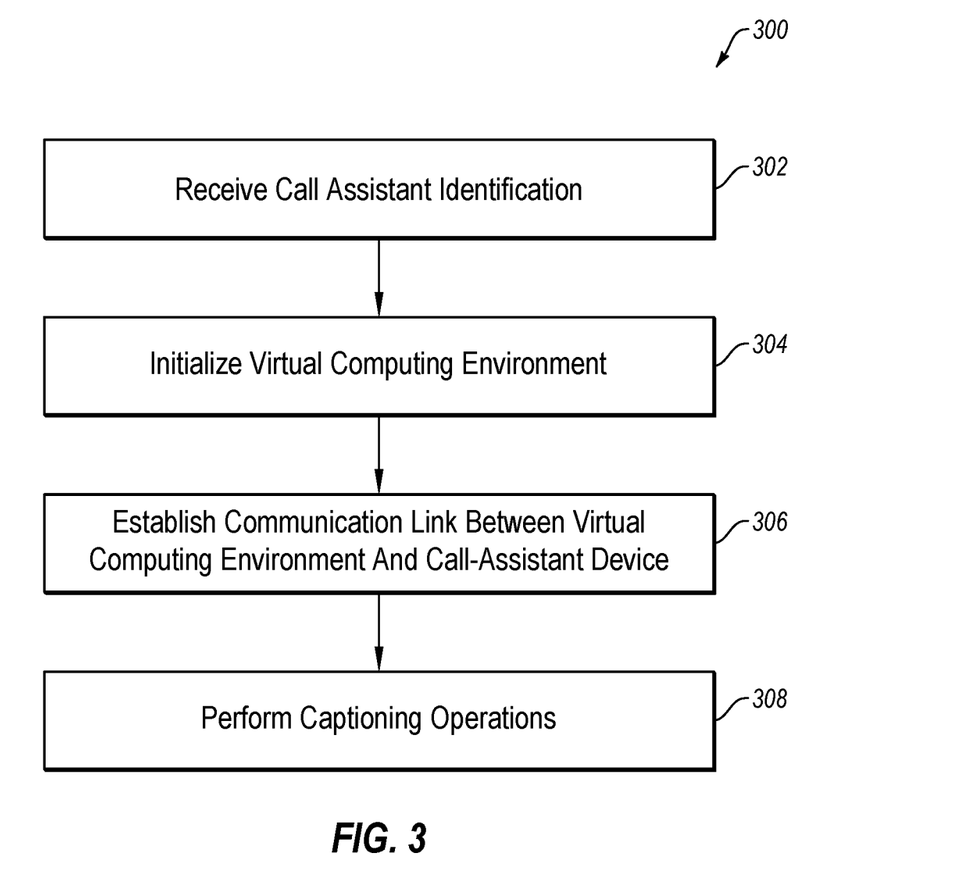
FIG. 3 is a flowchart of an example method to establish a virtual computing environment configured to perform one or more operations related to a captioning session.

FIG. 3 is a flowchart of an example method 300 to establish a virtual computing environment that may be configured to perform operations related to a captioning session. The method 300 may be arranged in accordance with at least one embodiment described in the present disclosure. The method 300 may be implemented, in some embodiments, by an administrative system such as the administrative system 132 described with respect to FIG. 1. In some embodiments, the method 300 may result from operations performed by a system based on instructions stored in one or more computer-readable media. Although illustrated as discrete blocks, various blocks may be divided into additional blocks, combined into fewer blocks, or eliminated, depending on the particular implementation.

The method 300 may begin at block 302 where an identification of a call assistant may be received. In some embodiments, the identification of the call assistant may be an identification of a call-assistant device that may be associated with the call assistant.

At block 304, a virtual computing environment may be initialized. For example, in some embodiments, the virtual computing environment may be a virtual machine that may be spun up from a golden image of the virtual computing environment. Additionally or alternatively, the virtual computing environment may be initialized by initializing an instance of a captioning software application or an instance of an operating system that may be executed on behalf of the call-assistant device. In some embodiments, the virtual computing environment may be initialized by spinning up the virtual machine, initializing the operating system on the virtual machine, and initializing the captioning software application on the operating system.

In some embodiments, the call assistant may be assigned to the virtual computing environment that is initialized at block 304 such that the virtual computing environment may be dedicated to the call assistant. In some embodiments, the virtual computing environment may be initialized in response to the call assistant being assigned to the virtual computing environment. In other embodiments, the virtual computing environment may be initialized prior to the call assistant being assigned to the virtual computing environment. In these or other embodiments, the virtual computing environment may be customized according to profile data of the call assistant in response to the call assistant being assigned to the virtual computing environment. The customization may be during or after initialization.

For example, during initialization, the virtual computing environment may be initialized and configured according to settings or preferences of the call assistant that may be included in profile data of the call assistant. Additionally or alternatively, the virtual computing environment may be initialized and then the settings or preferences may be applied at a later time. In some embodiments, the call assistant identification that is received at block 302 may be used to identify which profile data to use for customization.

Additionally or alternatively, the virtual computing environment may be customized for the call assistant by being directed to access the profile data of the call assistant with respect to certain operations. For example, in some embodiments, the captioning software application running in the virtual computing environment may be directed to access voice profile data of the profile data of the call assistant as part of the customization.

In some embodiments, more than one call assistant may be assigned to the virtual computing environment such that the virtual computing environment may be dedicated to more than one call assistant. In these or other embodiments, the virtual computing environment may be customized for more than one call assistant. For example, the virtual computing environment may be configured to host a first virtual machine that may run a first instance of the captioning software application that is tuned based on first voice profile data of a first call assistant and may be configured to also host a second virtual machine that may run a second instance of the captioning software application that is tuned based on second voice profile data of a second call assistant. In these or other embodiments the virtual computing environment may be dedicated to a first call assistant or a first call-assistant device during a first period of time and then dedicated to a second call assistant or call-assistant device during a second period of time. Additionally or alternatively, a new virtual environment may be created for and dedicated to each call assistant as they begin their shift or session.

At block 306, a communication link may be established between the virtual computing environment and the call-assistant device of the call assistant that may be assigned to the virtual computing environment. As indicated above, in some embodiments, the administrative system that is configured to host the virtual computing environment may be remotely located from the call-assistant device such that the communication link may be via a WAN. Additionally, reference to "establishing a communication link" between the virtual computing environment and the call-assistant device may include any suitable protocol or process of establishing a communication link to allow for the communication of data between the virtual computing environment and the call-assistant device. In some embodiments, the virtual computing environment may establish the communication link (e.g., a virtual machine may establish the link) or the administrative system may establish the communication link using routines or programs that may be outside of the virtual computing environment.

At block 308, the virtual computing environment may perform captioning operations related to a captioning session. In some embodiments, one or more captioning operations described below with respect to FIGS. 4A and 4B may be performed at block 308.

Modifications, additions, or omissions may be made to method 300 without departing from the scope of the present disclosure. For example, the functions and/or operations described may be implemented in differing order than presented or one or more operations may be performed at substantially the same time. Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments.

Figure 4A:
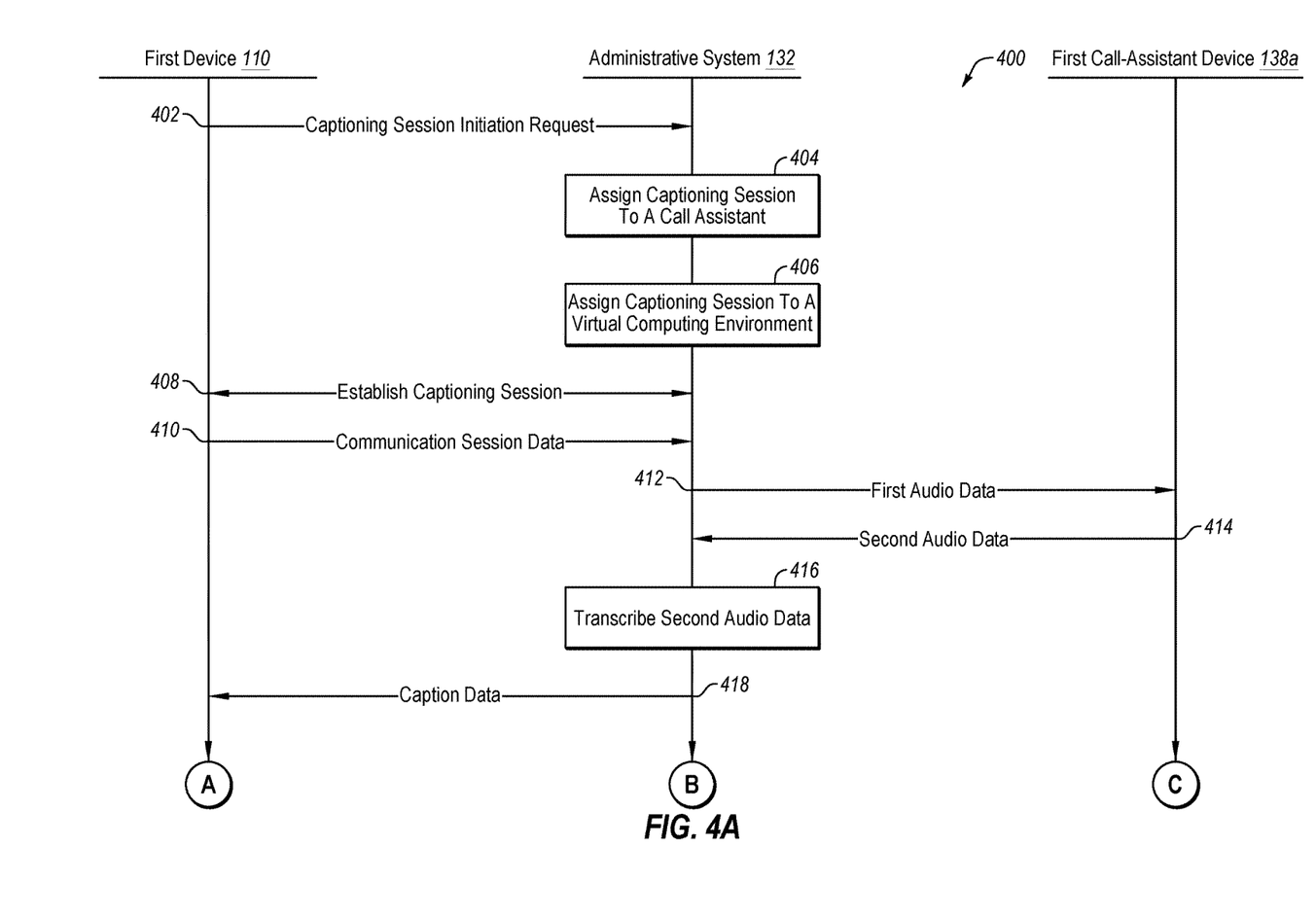
FIGS. 4A and 4B illustrate example operations that may be performed with respect to a captioning session in a captioning system.
Figure 4B:
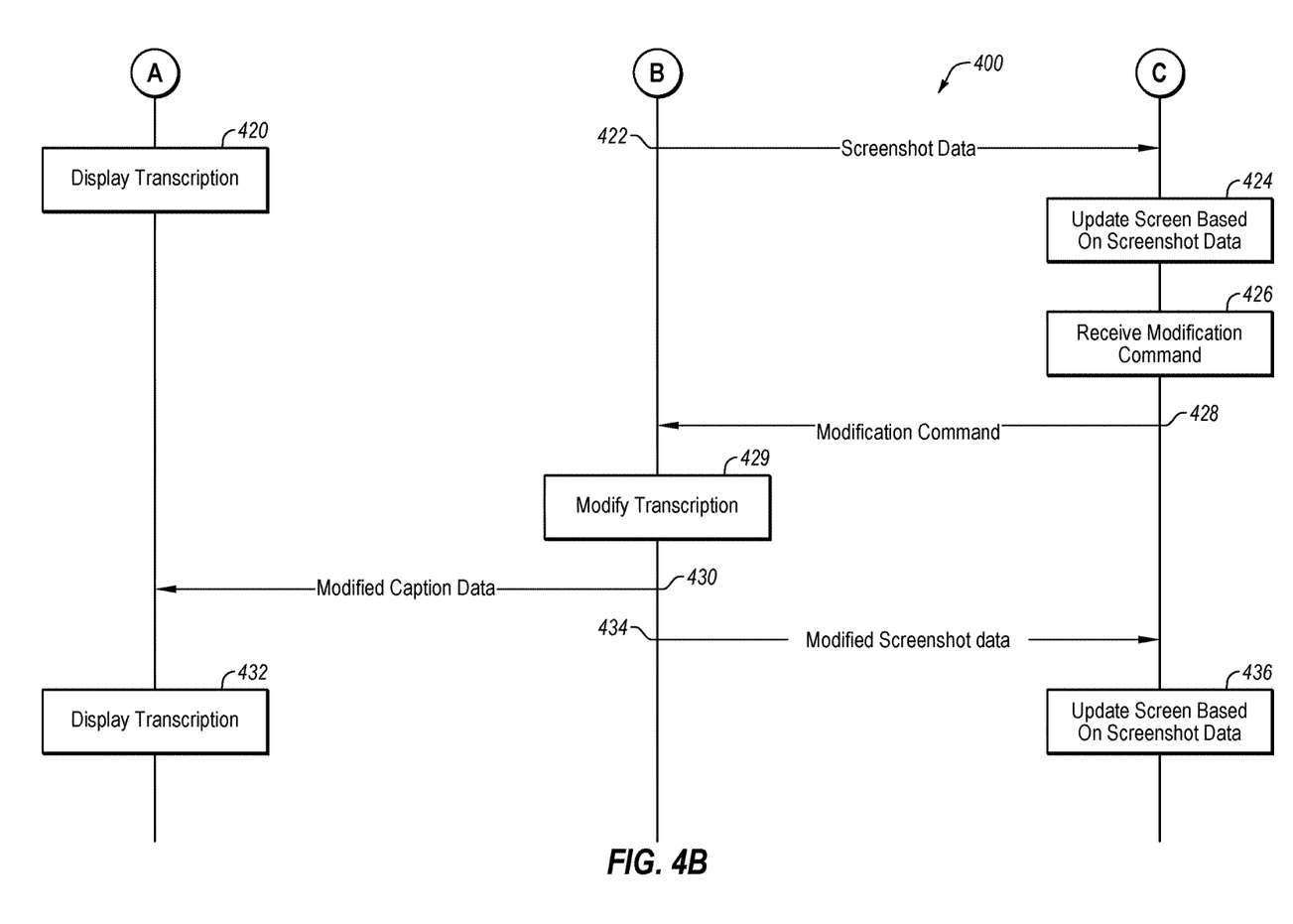

FIGS. 4A and 4B illustrate example operations that may be performed with respect to a captioning session. The operations of FIGS. 4A and 4B may be arranged in accordance with at least one embodiment described in the present disclosure. The operations of FIGS. 4A and 4B may be implemented, in some embodiments, by a communication system such as the communication system 100 described with respect to FIG. 1. In some embodiments, the operations of FIGS. 4A and 4B may result from operations performed by a system based on instructions stored in one or more computer-readable media. Although illustrated as discrete operations, various operations may be divided into additional operations, combined into fewer operations, or eliminated, depending on the particular implementation. Additionally, to ease the explanation, the operations of FIGS. 4A and 4B are described with respect to the first device 110, the administrative system 132, and the first call-assistant device 138a of FIG. 1.

At an operation 402, the first device 110 may direct a captioning session initiation request to the administrative system 132. In some embodiments, the first device 110 may direct the captioning session initiation request in response to a communication session being established with the second device 120 of FIG. 1. The captioning session initiation request may indicate to the administrative system 132 that a captioning session is to be established for the communication session.

At operation 404, the administrative system 132 may assign the captioning session to a call assistant. In the present example, the administrative system 132 may assign the captioning session to the first call assistant described above with respect to FIG. 1. In these or other embodiments, the administrative system 132 may assign the captioning session to the first call-assistant device 138a in response to the captioning session being assigned to the first call-assistant and in response to the first call-assistant device 138a corresponding to the first call assistant. Additionally or alternatively, the administrative system 132 may be configured to assign the captioning session to the first call-assistant device 138a and may accordingly assign the captioning session to the first call assistant due to the first call assistant corresponding to the first call-assistant device 138a.

At operation 406, the administrative system 132 may assign the captioning session to a virtual computing environment. In the present example, the administrative system 132 may assign the captioning session to the first virtual computing environment 134a of FIG. 1. In some embodiments, the administrative system 132 may initialize the first virtual computing environment 134a in response to assigning the captioning session to the first call assistant. In some embodiments, the initialization may be performed as described above with respect to block 304 of FIG. 3. In other embodiments, the first virtual computing environment 134a may already have been initialized. In these or other embodiments, the captioning session may be assigned to the first virtual computing environment 134a in response to the captioning session being assigned to the first call assistant and in response to the first virtual computing environment 134a being dedicated to the first call assistant. In some embodiments, the first virtual computing environment 134a may be configured to assign the captioning session to the first call assistant at operation 404 and may be configured to assign the captioning session to itself at operation 406. In these or other embodiments, the first virtual computing environment 134a may include a virtual machine that may be dedicated to more than one call assistant or call-assistant device 138. For example, the first virtual computing environment 134a may be dedicated to the first call assistant or the first call-assistant device 138a during a first period of time and then dedicated to another call assistant or call-assistant device 138 during a second period of time.

At operation 408, the first device 110 and the administrative system 132 may establish the captioning session. The establishment of the captioning session may include an indication to the first device 110 that communication session data associated with the communication session between the first device 110 and the second device 120 may be directed to the administrative system 132. In some embodiments, the first virtual computing environment 134a may be configured to establish the captioning session with the first device 110.

At operation 410, the first device 110 may direct the communication session data to the administrative system 132. In some embodiments, the communication session data may include first audio data that may be received by the first device 110 from the second device 120. The first audio data may include words spoken by the second user 104 during the communication session.

At operation 412, the administrative system 132 may direct the first audio data to the first call-assistant device 138a. In some embodiments, the administrative system 132 may direct the first audio data to the first call-assistant device 138a based on the first call assistant and/or the first call-assistant device 138a being assigned to the captioning session. In these or other embodiments, the first virtual computing environment 134a of the administrative system 132 may be configured to direct the first audio data to the first call-assistant device 138a. Additionally or alternatively, another routine or program that is outside of the first virtual computing environment 134a may direct the first audio data to the first call-assistant device 138a.

The first call-assistant device 138a may play the first audio data to the first call assistant and the first call-assistant may revoice the words included in the first audio data. The first call-assistant device 138a may be configured to generate second audio data that includes the words spoken by the first call assistant in the revoicing of the words included in the first audio data.

At operation 414, the first call-assistant device 138a may direct the second audio data to the administrative system 132. At operation 416, the administrative system 132 may generate caption data by transcribing the second audio data. The caption data may accordingly include a transcription of the second audio data, which may be a transcription of words spoken by the second user 104 during the communication session. In some embodiments, the administrative system 132 may use an instance of the captioning software application that may be running in the first virtual computing environment 134a to generate the caption data. In these or other embodiments, the captioning software application may be configured to access the first voice profile data of the first call assistant that may be included in the first profile data 142a to generate the caption data. In some embodiments, the captioning software application may be configured to access the first profile data 142a directly from the database 141 during generation of the caption data. Additionally or alternatively, the first profile data 142a may have been previously accessed from the database 141 and loaded into the captioning software application such as during initialization of the captioning software application.

In these or other embodiments, the administrative system 132 may also generate screen data based on the transcription. In some embodiments, the screen data may be generated based on the transcription by being based on the caption data. The screen data may be related to the display of a screen on a user interface that may be associated with the captioning software application. In some embodiments, the screen data may include a screenshot of the entire screen and that illustrates what may be displayed to the first call assistant by the captioning software application. In these or other embodiments, the screen data may include a modification to a particular portion of the screen and not an entire screenshot. In some embodiments, the screen data may include the transcription that may be included in the caption data. In these or other embodiments, the screen data may include the caption data. In these or other embodiments, the first virtual computing environment 134a may be configured to generate the screen data. Additionally or alternatively, another routine or program that is outside of the first virtual computing environment 134a may generate the screen data.

At operation 418, the administrative system 132 may direct the caption data to the first device 110. The first device 110 may display the transcription at operation 420 based on the received caption data and in response to receiving the caption data.

At operation 422, the administrative system 132 may direct the screen data to the first call-assistant device 138a. In some embodiments, the administrative system 132 may perform operations 418 and 422 at substantially the same time. Additionally or alternatively, in some embodiments the first virtual computing environment 134a may direct the communication of the caption data and the screen data or another routine or program that is outside of the first virtual computing environment 134a may direct the communication of the caption data and the screen data.

At operation 424, the first call-assistant device 138a may update its display screen based on the screen data in response to receiving the screen data. The updated display screen may illustrate the transcription of the second audio data in some embodiments.

At operation 426, the first call-assistant device 138a may receive a modification command. In some instances, the caption data may be inaccurate. For example, one or more words in the transcription may be incorrect. The modification command may be in response to an action performed by the first call assistant on the first call-assistant device 138a to correct the inaccuracies.

At operation 428, the first call-assistant device 138a may direct the modification command to the administrative system 132. At operation 429, the administrative system 132 may modify the transcription and accordingly modify the caption data and the screen data based on the received modification command.

At operation 430, the administrative system 132 may direct the modified caption data to the first device 110. The first device 110 may display the modified transcription at operation 432 based on the received modified caption data and in response to receiving the modified caption data.

At operation 434, the administrative system 132 may direct the modified screen data to the first call-assistant device 138a. In some embodiments, the administrative system 132 may perform operations 430 and 434 at substantially the same time. Additionally or alternatively, in some embodiments the first virtual computing environment 134a may direct the communication of the modified caption data and the modified screen data or another routine or program that is outside of the first virtual computing environment 134a may direct the communication of the modified caption data and the modified screen data.

At operation 436, the first call-assistant device 138a may update its display screen based on the modified screen data in response to receiving the modified screen data. The updated display screen may illustrate the modified transcription of the second audio data in some embodiments.

Modifications, additions, or omissions may be made to FIGS. 4A and 4B without departing from the scope of the present disclosure. For example, as indicated in some examples above, the operations may be performed in differing order than as described. Further one or more operations may be performed at substantially the same time in some embodiments. Additionally, the operations described with respect to FIGS. 4A and 4B may be performed for more than one captioning session with respect to more than one call assistant and call-assistant device at a time. In these or other embodiments, the administrative system 132 may be hosting more than one virtual computing environment at a time.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising:
    a first user device of a first user, the first user device being configured to perform operations related to a captioning session;
    a call-assistant device of a call assistant of a captioning system, the call-assistant device being remotely located from the first user device; and
    an administrative system communicatively coupled to and remotely located from the call-assistant device and the first user device, the administrative system being configured to:
        spin up a virtual computing environment based on a golden image that is a template for the virtual computing environment, the virtual computing environment being configured to run a captioning software application and being dedicated to the call assistant;
        receive, from the first user device, a request to initiate a captioning session;
        establish the captioning session with the first user device;
        assign the captioning session to the call assistant;
        receive, from the first user device and in response to establishing the captioning session, first audio data that is derived from a second user device that is performing a communication session with the first user device;
        direct the first audio data to the call-assistant device in response to the administrative system being assigned to the call assistant;
        receive from the call-assistant device, second audio data that is related to the first audio data and that is derived from speech of the call assistant;
        access, with the captioning software application, voice profile data of the call assistant based on the captioning session being assigned to the call assistant and based on the virtual computing environment being dedicated to the call assistant;
        generate, with the captioning software application, caption data that includes a transcription of the second audio data, the captioning software application being configured to use the accessed voice profile data to generate the caption data;
        generate, based on the transcription, screen data related to the captioning software application, the screen data including the transcription;
        direct the screen data to the call-assistant device; and
        direct the caption data to the first user device.

2. The system of claim 1, wherein:
    the call-assistant device is configured to:
        receive, from the call assistant, a modification command related to modification of the transcription; and
        direct the modification command to the administrative system; and
    the administrative system is configured to:
        modify, with the captioning software application, the caption data based on the modification command;
        modify the screen data based on the modified caption data;
        direct the modified screen data to the call-assistant device; and
        direct the modified caption data to the first user device.

3. The system of claim 1, wherein the virtual computing environment includes one or more of the following: an instance of an operating system, a virtual machine, and an instance of the captioning software application.

4. The system of claim 1, wherein the virtual computing environment is configured to:
    establish the captioning session with the first user device;
    receive the first audio data from the first user device;
    direct the first audio data to the call-assistant device;
    receive the second audio data from the call-assistant device;
    generate the screen data;
    direct the screen data to the call-assistant device; and
    direct the caption data to the first user device.

5. The system of claim 1, wherein the call-assistant device is configured as a thin-client device.

6. The system of claim 1, wherein the operations further comprise spin up the virtual computing environment as a customized virtual computing environment for the call assistant based on the voice profile data.

7. A system comprising:
    one or more processors; and
    one or more non-transitory computer-readable storage media communicatively coupled to the one or more processors and configured to store instructions that, when executed by the one or more processors, cause the system to perform operations related to a captioning session, the operations comprising:
        receive, from a first user device, first audio data that is derived from a second user device that is performing a communication session with the first user device, the first user device being configured to perform operations related to a captioning session;
        direct the first audio data to a remotely located call-assistant device;
        receive from the call-assistant device, second audio data that is related to the first audio data and that is derived from speech of a call assistant of the call-assistant device;
        access, with a captioning software application running in a virtual computing environment, voice profile data of the call assistant;
        spin up the virtual computing environment as a customized virtual computing environment for the call assistant based on the voice profile data and based on a golden image that is a template for the virtual computing environment;

generate, with the captioning software application, caption data that includes a transcription of the second audio data, the captioning software application being configured to use the accessed voice profile data to generate the caption data;

generate, based on the transcription, screen data related to the captioning software application, the screen data including the transcription;

direct the screen data to the call-assistant device; and direct the caption data to the first user device.

8. The system of claim 7, wherein the operations further comprise:

receive, by the virtual computing environment from the first user device, a request to initiate the captioning session; and establish, by the virtual computing environment, the captioning session with the first user device.

9. The system of claim 7, wherein the operations further comprise:

assign the captioning session to the call assistant; and assign the captioning session to the customized virtual computing environment based on the captioning session being assigned to the call assistant and based on the customized virtual computing environment being customized for the call assistant.

10. The system of claim 7, wherein the operations further comprise:

receive, from the call-assistant device, a modification command related to modification of the transcription;

modify, with the captioning software application, the caption data based on the modification command;

modify the screen data based on the modified caption data;

direct the modified screen data to the call-assistant device; and direct the modified caption data to the first user device.

11. The system of claim 7, wherein the virtual computing environment includes one or more of the following: an instance of an operating system, a virtual machine, and an instance of the captioning software application.

12. The system of claim 7, wherein the captioning software application running on the virtual computing environment is configured to:

receive the first audio data from the first user device;

direct the first audio data to the call-assistant device;

receive the second audio data from the call-assistant device;

generate the screen data;

direct the screen data to the call-assistant device; and direct the caption data to the first user device.

13. A method of performing captioning operations, the method being performed by a computing system and comprising:

spinning up a first virtual computing environment based on a golden image that is template for the first virtual computing environment and based on first profile data of a first call assistant of a captioning system, the first virtual computing environment being dedicated to the first call assistant and being configured to run a first instance of a captioning software application;

spinning up a second virtual computing environment based on the golden image and based on second profile data of a second call assistant of the captioning system, the second virtual computing environment being dedicated to the second call assistant and being configured to run a second instance of the captioning software application;

assigning a first captioning session to the first call assistant;

assigning the first captioning session to the first virtual computing environment based on the first virtual computing environment being dedicated to the first call assistant and based on the first captioning session being assigned to the first call assistant;

assigning a second captioning session to the second call assistant;

assigning the second captioning session to the second virtual computing environment based on the second virtual computing environment being dedicated to the second call assistant and based on the second captioning session being assigned to the second call assistant;

receiving, by the first instance of the captioning software application, first audio data from a remotely located first call-assistant device of the first call assistant, the first audio data being derived from speech of the first call assistant;

receiving, by the second instance of the captioning software application, second audio data from a remotely located second call-assistant device of the second call assistant, the second audio data being derived from speech of the second call assistant;

generating, with the first instance of the captioning software application, first caption data that includes a first transcription of the first audio data, the first instance of the captioning software application being configured to use the first profile data to generate the first caption data;

generating, with the second instance of the captioning software application, second caption data that includes a second transcription of the second audio data, the second instance of the captioning software application being configured to use the second profile data to generate the second caption data;

generating, based on the first transcription, first screen data related to the first instance of the captioning software application, the first screen data including the first transcription;

generating, based on the second transcription, second screen data related to the second instance of the captioning software application, the second screen data including the second transcription;

directing the first screen data to the first call-assistant device;

directing the second screen data to the second call-assistant device;

directing the first caption data to a first user device participating in a first communication session with a first other user device; and directing the second caption data to a second user device participating in a second communication session with a second other user device.

14. The method of claim 13, wherein:

the first profile data includes first voice profile data of the first call assistant; and the second profile data includes second voice profile data of the second call assistant.

15. The method of claim 14, wherein:

generating the first caption data includes accessing, by the first instance of the captioning software application, the first voice profile data and generating the first caption data based on the first voice profile data; and generating the second caption data includes accessing, by the second instance of the captioning software application, the second voice profile data and generating the second caption data based on the second voice profile data.

16. The method of claim 13, further comprising:

receiving, from the first call-assistant device, a first modification command related to modification of the first transcription;

modifying, with the first instance of the captioning software application, the first caption data based on the first modification command;

modifying the first screen data based on the modified first caption data;

communicating the modified first screen data to the first call-assistant device;

communicating the modified first caption data to the first user device;

receiving, from the second call-assistant device, a second modification command related to modification of the second transcription;

modifying, with the second instance of the captioning software application, the second caption data based on the second modification command;

modifying the second screen data based on the modified second caption data;

communicating the modified second screen data to the second call-assistant device; and communicating the modified second caption data to the second user device.

17. The method of claim 13, wherein the first virtual computing environment and the second virtual computing environment include one or more of the following: an instance of an operating system, a virtual machine, and an instance of the captioning software application.

18. The method of claim 13, wherein the first call-assistant device and the second call-assistant device are configured as thin-client devices.

19. At least one non-transitory computer-readable media configured to store one or more instructions that when executed by at least one computing system perform the method of claim 13.

20. A method of performing captioning operations, the method being performed by a computing system and comprising:

spinning up a virtual computing environment as a customized virtual computing environment for a call assistant based on voice profile data of the call assistant and based on a golden image that is a template for the virtual computing environment;

receiving, from a first user device, first audio data that is derived from a second user device participating in a communication session with the first user device, the first user device being configured to perform operations related to a captioning session;

directing the first audio data to a remotely located call-assistant device;

receiving from the call-assistant device, second audio data that is related to the first audio data and that is derived from speech of the call assistant;

accessing, with a captioning software application running in the virtual computing environment, the voice profile data of the call assistant;

generating, with the captioning software application, caption data that includes a transcription of the second audio data, the captioning software application being configured to use the accessed voice profile data to generate the caption data; and directing the caption data to the first user device.

21. The method of claim 20, further comprising assigning the captioning session to the customized virtual computing environment based on the captioning session being assigned to the call assistant and based on the customized virtual computing environment being customized for the call assistant.

22. The method of claim 20, further comprising:

receiving, by the virtual computing environment from the first user device, a request to initiate the captioning session; and establishing, by the virtual computing environment, the captioning session with the first user device.

23. The method of claim 20, wherein the virtual computing environment includes one or more of the following: an instance of an operating system, a virtual machine, and an instance of the captioning software application.

* * * * *